United States Patent
Ramfelt et al.

[11] Patent Number: 6,108,338
[45] Date of Patent: *Aug. 22, 2000

[54] METHOD AND DEVICE FOR DYNAMIC SYNCHRONOUS TRANSFER MODE IN A DUAL RING TOPOLOGY

[75] Inventors: Lars Håkan Ramfelt, Palo Alto, Calif.; Lars Markus Hidell, Lidingö, Sweden

[73] Assignee: Dynarc Inc., Calif.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 09/062,524

[22] Filed: Apr. 17, 1998

Related U.S. Application Data

[63] Continuation-in-part of application No. 08/757,347, Nov. 27, 1996, Pat. No. 5,838,687.

[30] Foreign Application Priority Data

Dec. 28, 1995 [SE] Sweden .................................. 9504679

[51] Int. Cl.[7] .......................... H04L 12/56; H04L 12/43; H04B 7/212
[52] U.S. Cl. .......................... 370/403; 370/443; 370/459
[58] Field of Search .................................. 370/223, 256, 370/255, 249, 294, 400, 401, 403, 405, 406, 438–439, 440, 452, 458, 459, 460, 468, 443

[56] References Cited

U.S. PATENT DOCUMENTS

| | | | |
|---|---|---|---|
| 4,542,502 | 9/1985 | Levinson et al. ........................ | 370/403 |
| 4,553,234 | 11/1985 | Brandsma et al. . | |
| 4,587,651 | 5/1986 | Nelson et al. ........................... | 370/458 |
| 5,282,199 | 1/1994 | Hertzberg et al. ...................... | 370/403 |
| 5,551,048 | 8/1996 | Steely, Jr. ................................ | 395/200 |
| 5,654,969 | 8/1997 | Wilhelm ................................. | 370/460 |
| 5,838,687 | 11/1998 | Ramfelt .................................. | 370/443 |

FOREIGN PATENT DOCUMENTS 0 451 426 B1  2/1994  European Pat. Off. .

OTHER PUBLICATIONS

Article: *The DTM Gigabit Network* by Christer Bohm, Per Lindgren, Lars Ramfelt, Peter Sjodin; dated Jun. 17, 1993; pp. 1–20, 22–23.

Article: *Fast Circuit Switching for the Next Generation of High Performance Networks; IEEE Journal on Selected Areas in Communications*, vol. 14, No. 2, Feb. 1996, by Christer Bohm, Markus Hidell, Per Lindgren, Lars Ramfelt, and Peter Sjödin; pp. 298–305.

Article: *Multi-gigabit networking based on DMT—A DTM medium access technique with dynamic bandwidth-allocation; Computer Networks and ISDN Systems 24 (1992) 119–130 North–Holland*; by Lars Gauffin, Lars Håkansson, and Björn Pehrson; pp. 119–130.

Article: *Incorporating continuation-of-message information, slot reuse, and fairness in DQDB networks; Computer Networks and ISDN Systems 24 (1992) 153–169 North Holland*; by Subrata Banerjee and Biswanath Mukherjee; pp. 153–169.

(List continued on next page.)

*Primary Examiner*—Chi H. Pham
*Assistant Examiner*—Steven Nguyen
*Attorney, Agent, or Firm*—Fasth Law Offices; Rolf Fasth

[57] ABSTRACT

A dynamic synchronous transfer mode network that comprises two ring topologies having opposite fiber direction. The first dynamic synchronous transfer mode ring topology has a plurality of nodes for receiving and transmitting frames. The time slots are dynamically allocated to the nodes and the first ring topology is adapted to transmit frames only in a first fiber direction. The second dynamic synchronous transfer mode ring topology also has a plurality of nodes in common with the first ring topology. The second ring topology only transmits frames in a second direction that is opposite the first fiber direction.

15 Claims, 2 Drawing Sheets

OTHER PUBLICATIONS

Article: *MetaRing—A Full–Duplex Ring with Fairness and Spatial Reuse; IEEE Transactions on Communications*, vol. 41, No. 1, Jan. 1993; by Israel Cidon and Yoram Ofek; pp. 110–120.

Article: *A Simple Scheme for Slot Reuse Without Latency for a Dual Bus Configuration*; by Oran Sharon and Adrian Segall, 1993 IEEE, 9 pages.

Article: *A Study of Slot Reuse in Dual Bus Multiple Access Networks* by Mark W. Garrett and San–Qi Li; 1990 IEEE, pp. 617–629.

Article: *L. Ramfelt*; by Manoel A. Rodrigues, AT&T Bell Laboratories, Holmdel, NJ 07733; 1990 IEEE; pp. 636–643.

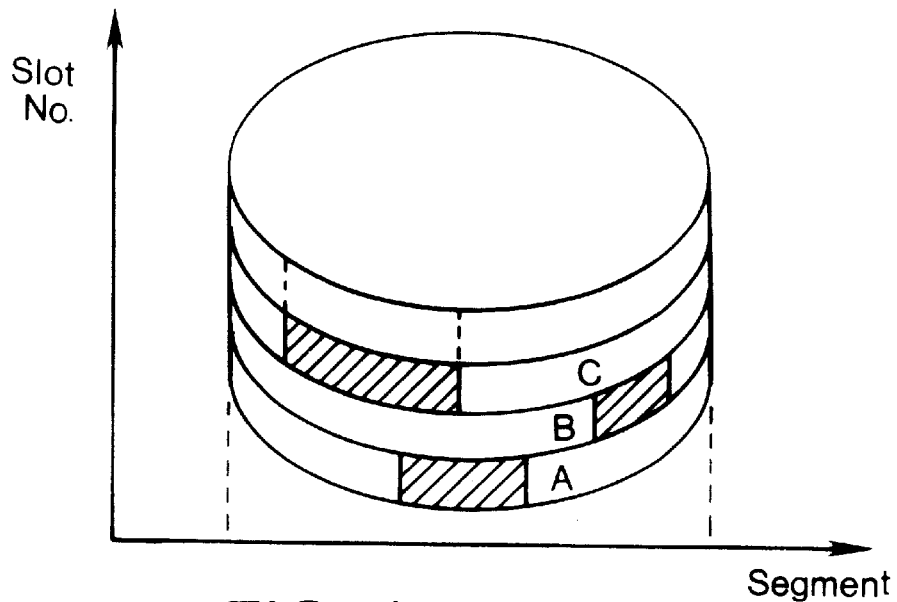
FIG. 4
FIG. 5
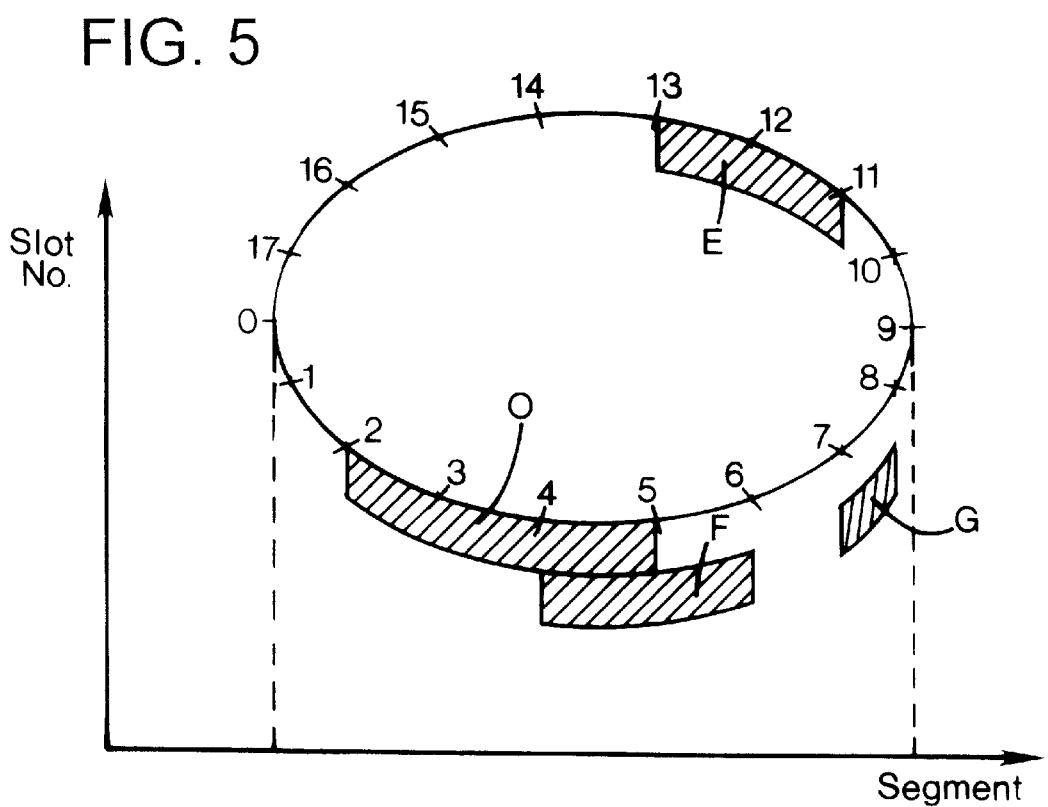

METHOD AND DEVICE FOR DYNAMIC SYNCHRONOUS TRANSFER MODE IN A DUAL RING TOPOLOGY

PRIOR APPLICATION

This application is a continuation-in-part application of U.S. patent application Ser. No. 08/757,347; filed Nov. 27, 1996 and claims priority of Swedish Patent Application No. 9504679-3; filed Dec. 28, 1995. U.S. patent application Ser. No. 08/757,347 issued as U.S. Pat. No. 5,838,687 on Nov. 17, 1998.

TECHNICAL FIELD

The present invention relates to a dynamic synchronous transfer mode (DTM) architecture in a circuit-switched network having a dual ring topology with opposite fiber directions.

BACKGROUND AND SUMMARY OF THE INVENTION

The next generation of networks are likely to integrate services such as delay-insensitive asynchronous applications including fax, mail, and file transfer with delay-sensitive applications having real-time requirements including audio and video. These applications have traditionally been supported by different network technologies and the integration between the different networks have been limited and cumbersome. In the past, asynchronous communication has been provided by computer networks that are packet-switched and use store-and-forward techniques, like the Internet. Real-time synchronous communication, on the other hand, has been provided by circuit switched, time-division multiplexed telephone networks.

Circuit-switched networks have many attractive features. For example, the circuits are isolated from one another in the sense that traffic on one circuit is unaffected by activities on the other circuits. This makes it possible to provide guaranteed transfer quality with constant delay which often is suitable for applications with timing requirements. Furthermore, information that is related to data and control are separated in circuit-switched networks. Processing of control information only takes place when circuits are created or terminated and the actual data transfer can be performed without the need for processing the data stream and controlling any congestion. This allows large volumes of data to be transferred efficiently.

The static nature of ordinary circuit-switched networks often makes them inappropriate for certain types of information flows. Traditionally, the circuits have fixed capacity, long set-up delay and poor support for multi-cast. These shortcomings make it difficult to efficiently support, for example, computer communication in a circuit-switched network. This has motivated a search for alternative solutions and the predominant view is that the next generation of telecommunication networks should be cell-switched based on asynchronous transfer mode (ATM). Cells are small, fixed-size packets, so ATM is similar to packet-switching. This means that many of the weaknesses of packet-switching are also present in cell-switched networks, particularly in the area of providing guaranteed quality of service. Therefore, additional mechanisms, such as admission control, traffic regulation, scheduling of packets on links and resynchronization at the receiver are needed to integrate support for different kinds of information flows. One of the main concerns with packet and cell switched networks in general, and ATM in particular, is whether it is possible to provide and use these mechanisms in a cost-effective way.

Shared medium local area networks (LANs), such as CSMA/CD, token ring and FDDI, are used in the Internet as building blocks connected by routers or bridges. The combination of easy expansion, low incremental node cost and tolerance to faulty nodes has resulted in simple, flexible, and robust networks. Also, the shared medium facilitates an efficient application of new multi-cast protocols such as IP multi-cast.

A drawback of the shared medium that is used today is that it typically permits only a single terminal to transmit at any time, thereby not utilizing all network segments efficiently. A design that allows the capacity of the medium to be reused may be designed, but this is often at the cost of increased complexity in the high-speed access control hardware. Access control mechanisms for a shared medium also directly depend on the size of the network and are usually efficient only for local area environments.

As indicated earlier, the two main types of networks commonly used are connection oriented circuit-switched networks used for telephone and packet-switched networks without connections that are used for computers, as exemplified by the Internet. When a circuit-switched network is used for data communication, the circuits must remain open between bursts of information which is often a poor use of the network capacity. This problem arises because circuit management operations are slow compared to the dynamic variations in the user demand. Another source of overhead in conventional circuit-switched networks is the limitation of requiring symmetrical duplex channels which add 100% overhead to the network when the information flow is unidirectional. This constraint also makes multi-cast circuits inefficient and difficult to implement. Packet-switched networks, on the other hand, lack resource reservation and must add header information to each message before the transmission is made. Furthermore, any latency in the packet-switched networks cannot be accurately predicted and packets may even be lost due to buffer overflow or corrupted headers. The latter two factors make real-time service difficult to support in packet-switched networks. Congestion avoidance mechanisms can isolate information streams of different users. These designs are, however, limited to time scale operations that are comparable to the round-trip packet delay.

DTM is a broadband network architecture that combines many of the advantages of circuit-switching and packet-switching in that DTM is based on fast circuit-switching augmented with a dynamic reallocation of resources, good support for multi-cast channels and DTM has means for providing short access delay. The DTM architecture spans from medium access, including a synchronization scheme, up to routing and addressing of logical ports at the receiver. DTM is designed to support various types of information flows and can be used directly for application-to-application communication, or as a carrier network for other protocols such as ATM or IP (The Internet Protocol).

It has been shown that the signaling delay associated with the creation and termination of communication channels determines much of the efficiency of fast circuit-switching. DTM is designed to create channels fast, within a few hundreds of microseconds. DTM differs from burst switching in that information related to control and data are separated and DTM uses multi-cast, multi-rate, high capacity channels to support a variety of different classes of information flows. For example, it is possible to increase or decrease the allocated resources of an existing channel depending on the particular requirements of the user at the time. Even though a DTM network may have the potential of creating a channel for every message, this approach may not be suitable for all information flows. Rather, it is up to the user to decide whether to establish a channel per information burst or to keep the channel established even during idle periods.

The DTM concept uses channels as the communication abstraction. The DTM channels differ from telephone circuits in many ways. First, the establishment delay is short so that resources can be allocated/deallocated dynamically as fast as user requirements change. Second, the DTM channels are simplex to minimize the overhead when the communication is unidirectional. Third, the DTM channels offer multiple bit-rates to support large variations in user capacity requirements. Finally, the DTM channels are multi-cast to allow any number of destinations.

The DTM channels require no transfer of control information after a channel is established resulting in a very high utilization of network resources for large data transfers. The support of any real-time information flow is effective and there is no problems related to policing, congestion control or flow-control within the network. As mentioned earlier, the control information is separated from the data information which makes multi-cast less complex. The transmission delay is negligible (i.e., less than 125 $\mu$s) and there is virtually no potential for data loss caused by buffer overflow as in ATM. Bit-error rates depend on the underlying link technologies, and switches are simple and fast due to the strict reservation of resources at the channel setup.

The DTM topology may be structured as a ring which has the advantage of reducing the hardware requirement with 50% compared to dual bus structures. All nodes are able to communicate with each other on a ring topology by using only one fiber optic in contrast to a bus structure that always require at least two fibers in opposite direction to enable all the nodes to communicate with each other.

More particularly, the present invention is a dynamic synchronous transfer mode network that comprises two ring topologies having opposite fiber directions. The first dynamic synchronous transfer mode ring topology has a plurality of nodes for receiving and transmitting frames. The time slots are dynamically allocated to the nodes and the first ring topology is adapted to transmit frames only in a first fiber direction. The second dynamic synchronous transfer mode ring topology also has a plurality of nodes in common with the first ring topology. The second ring topology only transmits frames in a second direction that is opposite the first fiber direction. The first and second ring topologies may also each comprise an expansion node that has an expandable buffer segment for storing frames transmitted by the nodes.

BRIEF DESCRIPTION OF THE DRAWINGS

FIG. 4 is a schematic view of a ring topology showing three separate channels; and FIG. 5 is a schematic view of the DTM ring topology of the present invention showing slot reuse of different segments.

DETAILED DESCRIPTION

Figure 1:
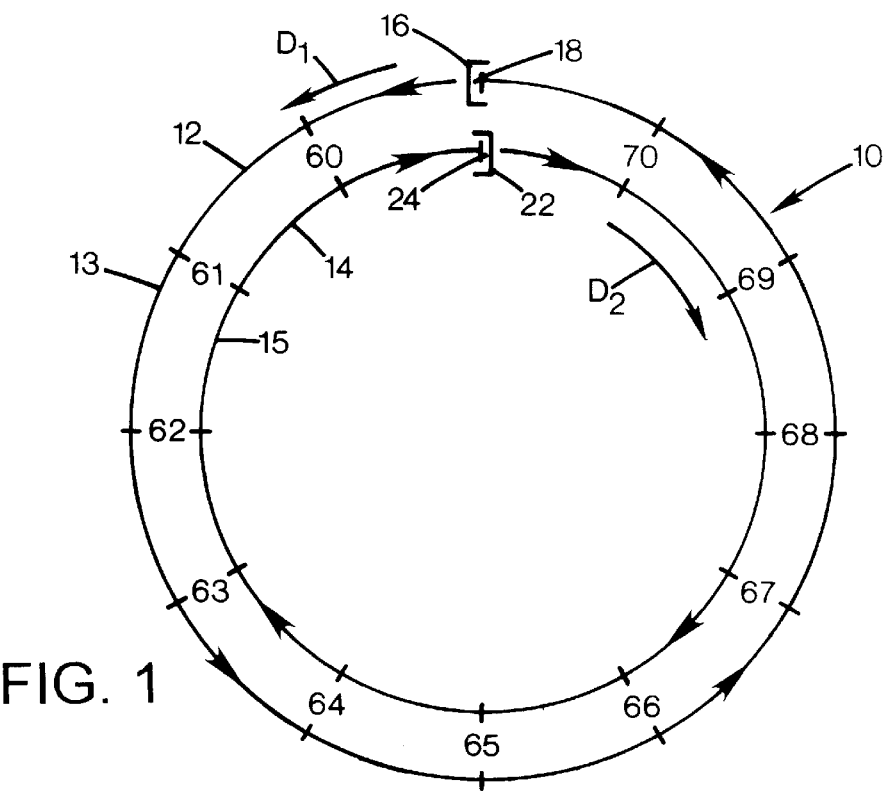
FIG. 1 is a schematic view of a dual DTM ring topology of the present invention.
Figure 2:
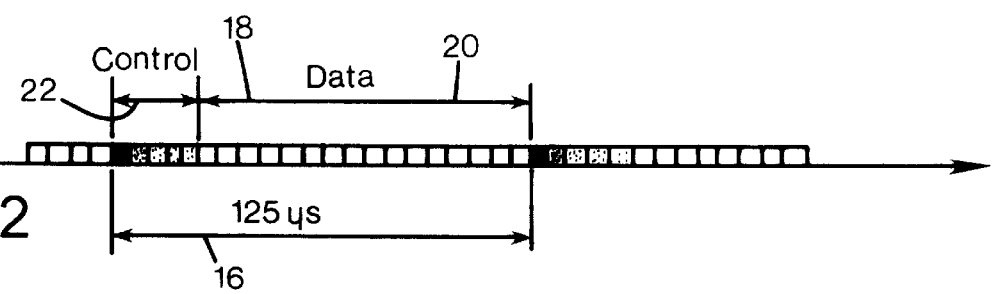
FIG. 2 is a schematic view of a DTM cycle of the present invention having the data time slots separated from the control time slots.

With reference to FIGS. 1–2, the present invention is a dynamic synchronous transfer mode (DTM) ring topology system 10 having a first ring topology 12 and a second ring topology 14. The total capacity of the ring topologies 12, 14 may be divided into cycles of 125 microseconds which are further dividable into 64-bit slots.

One feature of the DTM ring topologies 12, 14 is that the cycle time and the slot length are, preferably, constant throughout the DTM ring topologies 12, 14. The DTM ring topologies 12, 14 are designed for a unidirectional medium with multiple access such as fiber optics medium 13, 15 having a capacity that is shared by all the connected nodes. The slots may be dynamically allocated between the nodes, as required.

The first ring topology 12 is adapted to transfer data in a first rotational direction, as shown by an arrow D1, such as in a counter-clockwise direction, and the second ring topology 14 is adapted to transfer data in a second rotational direction, as shown by an arrow D2, such as in a clockwise direction. It is to be understood that the first rotational direction may be clockwise and the second rotational direction may be counter-clockwise as long as the first fiber direction is different from the second fiber direction. Both the first and second ring topologies 12, 14, preferably, have an effective length that is an integer multiple of 125 microseconds long cycles. As described in detail below, although the actual length of the ring topologies is not an integer multiple of 125 microseconds, the effective length of the ring topologies may be adjusted with expansion nodes.

The first ring topology 12 may comprise an expansion node 16 that may be used to precisely adjust the effective length of the ring topology 12 although the physical length of the ring topology 12 is not an integer multiple of the cycle time. The expansion node 16 may include an expandable buffer segment such as a FIFO (first-in-first-out) queue 18 for storing incoming cycles or frames of time slots. The queue 18 permits a time expansion of the first ring topology 12 to store incoming cycles in the queue 18 a suitable amount of time to optimize the use of the expansion node 16 by permitting the expansion node 16 to generate cycles periodically (every 125 microseconds) into the ring topology independently of the availability of any incoming cycles in the FIFO queue 18 at the transmission time of the new cycle.

The first ring topology 12 preferably has a plurality of nodes 60–70 and at least one of the nodes is selected as the expansion node 16. The method of selecting the expansion node 16 may be performed according to a suitable selection method such as selecting the node that has the highest or the lowest predetermined identification number.

Similarly, the second ring topology 14 preferably comprises an expansion node 22 that may be used to precisely adjust the effective length of the second ring topology 14. The expansion node 22 may include an expandable FIFO queue 24 to optimize the use of the expansion node 22 and to properly synchronize the incoming cycles or frames in the expansion node 22. The second ring topology 14 preferably shares the nodes with the first ring topology 12 although the fiber direction of the second ring topology 14 is opposite that of the fiber direction of the first ring topology 12.

Figure 3:
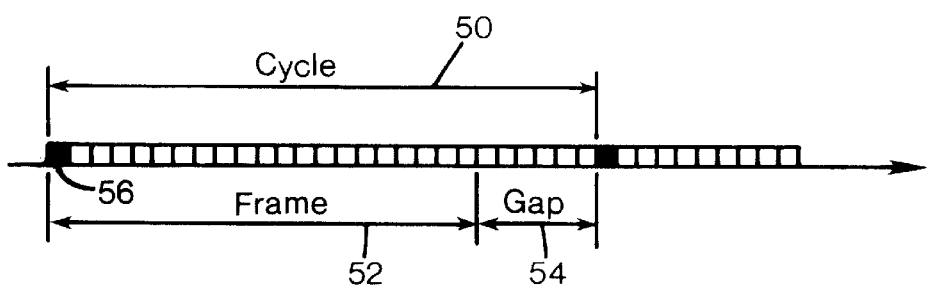
FIG. 3 is a schematic view of a DTM cycle including a frame and gap slots.

FIG. 3 illustrates the details of a complete time cycle 50 that may be defined as an integer number of time slots corresponding to about 125 microseconds. The cycle 50 may be divided into a frame 52 and gap slots 54. The frame 52 may be used to include data slots for carrying pay loads and control slots for carrying control and management messages.

It is necessary to include the gap slots 54 in each cycle 50 because each node in the ring topology 10 may not be perfectly synchronized to 125 microseconds and the gap slots 54 may be used to accommodate any variations between the nodes. The gap slots 54 are preferably never used to carry payloads but are only used as an adjustment mechanism. The number of gap slots 54 may be adjusted up or down a few slots so that the average cycle time is very close to 125 microseconds.

In the preferred embodiment, the frame 52 may also include a start slot 56 that is disposed in the beginning of the frame 52 to define the start of a new cycle. In this way, the frame 52 is a fixed number of slots that is slightly less than the total number of slots in the cycle 50.

In general, the service provided by the DTM ring topologies 12, 14 of the present invention are, preferably, based on channels. A channel may be defined as a set of time slots having a sender and an arbitrary number of receivers. The result is that it is guaranteed that the data will reach the receivers at the rate given by the capacity of the channel. The channels on the physically shared medium may be illustrated by a time division multiplexing (TDM) scheme (see FIG. 2). The total capacity of the shared medium may be divided into cycles 26 having a length of 125 microseconds which are further divided into 64-bit slots 28. It is to be understood that other cycles and slot sizes may be used. The transmission medium can, in addition to optical fibers, be a coaxial cable or another medium with high capacity. In the description, the transmission medium will be referred to as an optical fiber.

The time slots are preferably separated into data slots 30 and control slots 32. As described in detail below, each node 60–70 has access to at least one control slot 32 associated therewith that may be used for sending control information to the other nodes in the network. For example, control messages may be sent upon a request from a user and in response to control messages from other nodes or simultaneously for management purposes. The control slots 32 may constitute a small fraction of the total capacity while the major part of the slots are, preferably, data slots 30 for carrying payload information.

All the connected nodes 60–70 and the expansion nodes 16, 22 in the ring topologies 12, 14 share all the available data slots. An important feature of the DTM concept is the time division multiplexing scheme illustrated in FIG. 2. The position of a particular set of slots in the cycles may be used to determine which of the nodes have access to the particular set of slots. In other words, a data slot is always owned by exactly one node at a particular time and only the owner of a data slot at a particular time may use the data slot to send information on a specific segment. If slot reuse is used, then the same slot may be used simultaneously by more than one user but on different segments of the ring topologies 12, 14.

However, a node may dynamically allocate resources to another node in the ring topologies such as by dynamically allocating a data slot or a set of data slots to another node if the other node needs more slots to fulfill a request. In this way, the ownership of the data slots may vary and is negotiated by the nodes through the control slots 32. In each network node there may be a node controller that controls the access to the data slots and performs network management operations, such as network start-up and error recovery. The main tasks of the node controller are to create and terminate channels on demand from users and to manage network resources in response to user requests. Preferably, control slots are used exclusively for messages between node controllers. As mentioned earlier, each node controller has write access to at least one control slot in each cycle which it uses to broadcast control messages to down-streams nodes. Since write access to control slots is exclusive, the node controller always has access to its control slots regardless of other nodes and network load. The number of control slots a node uses may dynamically vary during network operation.

As mentioned earlier, the majority of the slots in a cycle are data slots. Access to data slots may change over time depending on the requirements of the users connected to the nodes in the ring topologies. Write access to the slots may be controlled by slot tokens (or tokens for short). A node controller may write data into a slot only if it owns the corresponding token. The token protocol guarantees the slot access to be conflict free, which means that not more than one node writes data into the same slot for a specific segment.

Status messages may be used to distribute information about the pool of free tokens available among the nodes in the network. Status message information may be used to assist a node to choose a suitable node when requesting for more resources such as more slots. In this way, each node may regularly broadcasts status information about how many free tokens the node has. The other nodes may store this information in their status tables. A node that requires more capacity may consult its status table to decide from which node to request more slots. The broadcast status information provides an approximate view of the current state of token information so that token requests may be rejected because they were sent to nodes that no longer have tokens to give away.

The DTM system of the present invention permits a multiple access to the data slots depending upon which node has been allocated the slots according to the allocation system used in the network. In this way, the position of the slots in the cycle may be used to determine which node is going to use the data slots and there is no need to include a header in the message.

According to the DTM protocol, when the expansion nodes 16, 22 and nodes 60–70 in the ring topologies 12, 14 read the slots of a frame transmitted by or received from a preceding node, including the expansion nodes 16, 22, the nodes may either copy the information of the slots and send the information to the local user of the particular node and transmit the same information to the next node in the ring topologies 12, 14. If a slot reuse method is used, the nodes 60–70 may also read and copy the information of the slots and send the copied information to the local user and then change the information or write new information into the slots before the frame is forwarded to the next node. Of course, the nodes may neither read or copy the information of a particular node.

As noted above, one important feature of the present invention is that the cycle time is preferably constant to maintain the synchronization of the entire ring topology system 10. Additionally, each cycle has a constant number of slots although each slot in every cycle may or may not contain any information. It is also important to note that it is possible to increase the bit rate per seconds in the fiber optics 13, 15 thereby increasing the number of slots per cycle without losing the synchronization of the ring topologies 12, 14 of the network. It is even possible to connect the ring topology system 10 to another network that runs at a different speed and the synchronization may be maintained if the cycle time and slot length are constant.

If a slot reuse method is used, a single slot may be used multiple times on the ring topologies. Slot reuse enables simultaneous transmissions in the same slot over disjoint segments of the ring topologies 12, 14. Slot reuse may be described as a general method to better utilize shared links in the ring topologies 12, 14.

To allow slot reuse in DTM, the block token format may be extended to include parameters describing the segments it is representing. The token management protocol may also be modified to avoid conflicts in the slot number dimension as well as the segment dimension.

The fact that the first DTM ring topology 12 has a fiber direction that is opposite the fiber direction of the second DTM ring topology 14 improves the capacity of the ring topology system 10. The capacity of the system depends partly on the bit rate per second of the particular fiber optics used. For example, the bit rate per second may be a fixed value such as 1 billion bits per second. Of course, the bit rate per second may be a higher value or a lower value. The higher the bit rate of the fiber optics the more slots per 125 microseconds cycle. As explained in detail below, the actual throughput of the ring topology system 10 may be higher than the bit rate of the fiber optics 13, 15 by reusing slots in the ring topologies 12, 14 in certain segments of the ring topologies. In other words, the same slots may be used by different users in different segments of the ring topologies so that a slot may be used more than once. However, the number of slots per cycle does not increase only the number of times the slots are used to send frames if the number of slots required by the messages or channels exceeds the number of slots in the cycle.

Assuming that both the ring topologies 12, 14 have the same fiber direction, the total capacity of the system 10 is the bit rate of ring topology 12 in addition to the bit rate of the ring topology 14, i.e., the total bit rate is double the bit rate of only one of the ring topologies.

By providing the ring topologies 12, 14 with fiber directions that are opposite to one another, the average distance a frame must travel from a source node to a destination node is reduced to half the average distance of a single ring topology 12. The average travel distance in a single ring topology or a dual ring topology, with the same fiber direction, is half the ring circumference while the average travel distance in a dual ring topology having opposite fiber directions is only one quarter of the ring circumference. By reducing the average distance, the total capacity of dual rings with opposite fiber direction is twice as high as the total capacity of a dual ring where both rings have the same fiber direction.

In this way, a ring topology doubles the capacity compared to a dual bus topology because any source node can reach any destination node. In contrast, a bus topology requires at least two buses, one in each direction, to enable any source node to reach any destination node in the bus topology. A dual ring topology having the same fiber direction doubles the capacity compared to a single ring topology. A dual ring topology with opposite fiber directions doubles the capacity compared to a dual ring topology with the same fiber direction. Therefore, the total capacity of a dual ring topology having opposite fiber directions is eight times higher than a conventional bus topology.

In the dual ring topology system 10 of the present invention, a source node may select the shortest way to a destination node by using the identification number of each node. For example, the shortest way from the source node 61, as shown in FIG. 1, to the destination node 69 is in the clockwise D2 and requires the involvement of at least 4 nodes before reaching the destination node 69 by using the ring topology 14. As indicated above, information may either be transmitted in a clockwise or counter-clockwise direction. The shortest way may be calculated as the smallest value of: a) the chronological number of the destination node (69) minus the chronological number of the source node (61) which equals 8; and b) chronological number of the source node (61) plus the total number of nodes in the ring topology (12) minus the chronological number of the destination node (69) which equals 4. Because 4 is lower than 8, the message will be sent in the D2 direction because that is the shortest way.

As mentioned above, the expansion node 12 or any other node 14 in the ring topology 10 may create a channel by allocating a set of data slots for the channel to each node and by sending a channel establishment control message. The control message may be addressed either to a single node or to a multi-cast group and announces that the channel has been created and what slots are used.

A traditional circuit is often a point-to-point connection between a sender and a receiver. DTM, on the other hand, uses a shared medium which inherently supports multi-cast since a slot can be read by several nodes in a ring topology.

Access delay is the average time from the time that a request arrives to the node until the data transfer starts. It is a measure of the overhead of the channel establishment and includes the time it takes to allocate slots, send a channel establishment message to the receiver and send the first slot of data. In the multi-hop case, the sender waits for a confirmation from the receiver that the channel has been established on both ring topologies before it starts sending data. For the single hop case, the sender alone may create the channel to the receiver and can therefore start sending data as soon as the slots have been allocated.

The access delay consists, when there is a low load condition, mainly of the time it takes for a node to process the transfer request, waiting time for the first available control slot (for the channel establishment message) and then for the first data slot. When the load increases, the nodes have to request slots from other nodes and more delay may be introduced.

Control messages for the channel establishment and bandwidth reallocation may carry sets of tokens as parameters. However, a control message is, preferably, 64 bits and can therefore have only a small number of parameters. This means that if a user requests a large bandwidth transfer, it may be necessary to send several control messages to create the channel. This may introduce extra access delay and consumes signaling capacity. Several mechanisms have been considered to decrease the amount of information that needs to be sent during the channel creation and token reallocation. The first optimization in token management is to introduce block tokens. A block token may be transferred in a single control message and represents a group of tokens, but can only be used for particular combinations of tokens. For instance, a block token may be denoted by a slot number and an offset giving the number of contiguous slots in the group. The block token optimization assumes that the token pool is not fragmented into small pieces. An amount of small token blocks in the free pool may be a problem and will be referred to as fragmentation.

The token protocol guarantees that a data slot can never be used by two nodes simultaneously on the ring topology. Sometimes this protocol is too conservative. FIG. 4 shows an example of how three tokens (A, B, and C) are reserved for three channels. The nodes are connected by segments and channels typically use a subset of the segments on the ring structure (gray color) and the rest are reserved (white color) but left unused and thus wasting shared resources. A better alternative is to let the channels only reserve capacity on the segments between the sender and the receiver as the example illustrated in FIG. 5. A single slot may in this case be used multiple times on the ring topology. Channel D is using the same slots as channel E but on different segments. Similarly, channel F and channel G use the same slots but on different segments. This is referred to as slot reuse. Slot reuse enables simultaneous transmissions in the same slot over disjointed segments of the ring topology. Because the ring topology is round, it is also possible to reserve slots from the end segments to the start segment, such as from segment 16 to segment 2. This is an added feature of ring structures that is not available in single or dual straight bus topologies.

There are additional factors that may influence the utilization in DTM topologies. First, each node is assigned signaling capacity in the form of control slots, which means that there are fewer slots available for data transfer on a ring with many nodes, given a fixed link capacity. Secondly, token reallocation may incur overhead since while a slot token is being reallocated between nodes, the corresponding slot cannot be used for data transfer.

While the present invention has been described with reference to preferred embodiments, it is to be understood that certain substitutions and alterations may be made thereto without departing from the spirit and scope of the invention as set forth in the appended claims.

We claim:

1. A dynamic synchronous transfer mode network for transmitting information, comprising:

a first dynamic synchronous transfer mode ring topology having a first node, a second node, a third node and a fourth node for receiving and transmitting frames, the first ring topology using time division multiplexing of time cycles that are dividable into time slots, a first set of time slots being dynamically allocated to the first node, a second set of time slots being dynamically allocated to the second node and a third set of time slots being dynamically allocated to the third node and a fourth set of time slots being dynamically allocated to the fourth node, a portion of the first set of time slots being dynamically allocatable to the second node, the first topology being adapted to transmit frames only in a first fiber direction;

a second dynamic synchronous transfer mode ring topology having the first node, the second node and the third node in common with the first ring topology, the second ring topology being adapted to transmit frames only in a second fiber direction that is opposite the first fiber direction; and the fourth node being an expansion node having an expandable buffer segment for storing incoming frames transmitted by the first node, the second node and the third node;

a first segment in the first ring topology extending from the fourth node to the first node;

a second segment in the first ring topology extending from the second node to the third node so that the second segment is disjointed from the first segment;

an extended DTM block token format describing the first and second segments; and the fourth node being arranged to reserve block token capacity only on the first segment and the second node being arranged to reserve block token capacity only on the second segment to permit a simultaneous transmission in the same time slot over the first and second disjointed segments.

2. The dynamic synchronous transfer mode network according to claim 1 wherein the time division multiplexing of the capacity into time cycles that are dividable into dynamic data slots and static control slots, the first node is provided with an exclusive writing access to a first control slot and the second node is provided with an exclusive writing access to a second control slot and the third node is provided with an exclusive writing access to a third control slot.

3. The dynamic synchronous transfer mode network according to claim 1 wherein the second dynamic synchronous transfer mode ring topology further comprises a fourth node that is an expansion node that has an expandable buffer segment for storing incoming frames transmitted by the first node and the second node.

4. The dynamic synchronous transfer mode network according to claim 3 wherein the buffer segment is a FIFO queue.

5. The dynamic synchronous transfer mode network according to claim 1 wherein the first node and the second node are connected to both the first ring topology and the second ring topology so that the first node and the second node are capable of receiving and transmitting frames on both the first ring topology and the second ring topology.

6. The dynamic synchronous transfer mode network according to claim 1 wherein the first ring topology and the second ring topology has a combined throughput and the first ring topology has a first capacity, the combined throughput is four times greater than the first throughput.

7. A method of transmitting frames in a dual dynamic synchronous transfer mode ring topology, the method comprising the steps of:

providing a first dynamic synchronous transfer mode ring topology having a first node, a second node and a third node, the first ring topology having a time division multiplexing capacity of time cycles that are dividable into time slots, the first ring topology transmitting frames only in a first fiber direction;

providing a second dynamic synchronous transfer mode ring topology sharing the first node, the second node and the third node with the first ring topology, the second ring topology transmitting frames only in a second direction, the first direction being opposite the second direction, the first and second ring topologies comprising a plurality of disjointed segments;

dynamically allocating a first set of time slots to the first node;

dynamically allocating a second set of time slots to the second node;

the second node requesting a portion of the first set of time slots from the first node;

the first node allocating the portion of the first set of time slots to the second node;

determining a shortest way from the second node to the first node;

if the shortest way is in the first direction then transmitting the frame from the second node to the first node in the first direction on the first ring topology;

if the shortest way is in the second direction then transmitting the frame from the second node to the first node in the second direction on the second ring topology; and transmitting a throughput simultaneously in the same slot over disjointed segments.

8. The method of transmitting the frames according to claim 7 wherein step of allocation the portion of the first set of time slots further comprises the step of providing access of the portion of the first set of time slots to the second node.

9. The method of transmitting the frames according to claim 7 wherein the method further comprises the steps of dividing the time cycles into dynamic time slots and static control slots and assigning a first control slot to the first node and a second control slot to the second node.

10. The method of transmitting the frames according to claim 7 wherein the method further comprises the steps of sending a control message in the second control slot from the second node to the first node.

11. The method of transmitting the frames according to claim 7 wherein the step of transmitting the frames in the first direction further comprises the step of transmitting a control message to the first node informing the first node which slots of the second set of time slots and the portion of the first set of time slots are allocated for the channel that carries the frames.

12. A method of transmitting a frame in a dual dynamic synchronous transfer mode ring topology, the method comprising the steps of:

providing a first and a second ring topology having nodes, the first and second ring topologies each having a capacity that is dividable into a number of time slots, the first ring topology having a source node and the second ring topology having a destination node, the first ring topology being adapted to only transmit frames in a first direction and the second ring topology being adapted to only transmit frames in a second direction, the first direction being opposite the second direction, the first and second ring topologies having a plurality of disjointed segments;

determining a first number of nodes from the source node to the destination node in the first direction of the first ring topology;

determining a second number of nodes from the source node to the destination node in the second direction of the second ring topology;

if the second number of nodes is greater than the first number of nodes then transmitting a frame from the source node to the destination node in the first direction;

if the first number of nodes is greater than the second number of nodes then transmitting the frame from the source node to the destination node in the second direction; and transmitting a throughput simultaneously in the same slot over disjointed segments.

13. The method of transmitting the frame according to claim 12 wherein the method further comprises the step of providing the first ring topology with an expansion node having an expansion buffer.

14. The method of transmitting the frame according to claim 13 wherein the method further comprises the step of the expansion node receiving the frames and forwarding the frames to a node that is downstream of the expansion node.

15. The method of transmitting the frame according to claim 14 wherein the method further comprises the steps of the expansion node storing the frames in the expansion buffer and synchronizing the frames.

* * * * *